UNITED STATES PATENT OFFICE.

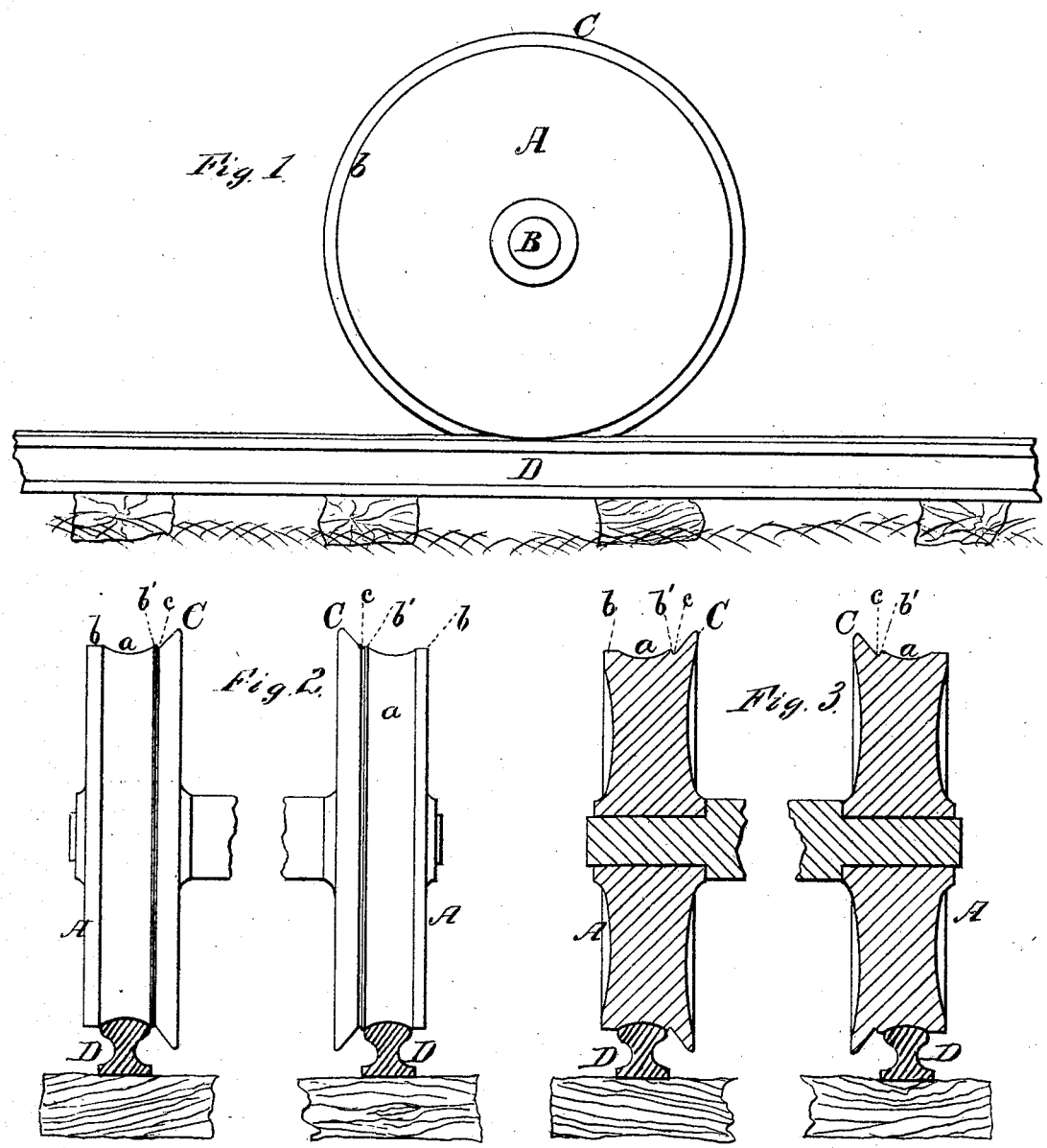

JAMES PEARSON, OF SACRAMENTO, CALIFORNIA.

IMPROVEMENT IN CAR-WHEELS.

Specification forming part of Letters Patent No. 151,908, dated June 9, 1874; application filed January 17, 1874.

*To all whom it may concern:*

Be it known that I, JAMES PEARSON, of Sacramento, in the county of Sacramento and State of California, have invented a new and valuable Improvement in Car-Wheels; and I do hereby declare that the following is a full, clear, and exact description of the construction and operation of the same, reference being had to the annexed drawings making a part of this specification, and to the letters and figures of reference marked thereon.

Figure 1 of the drawings is a representation of a side view of my car-wheel. Fig. 2 is an end view of the same. Fig. 3 is a sectional view of the same.

This invention has relation to wheels for railroad-cars; and it consists in a car-wheel having a transversely concave tread, which is isolated from the flange by an annular groove, as and for the purposes hereinafter explained.

In the annexed drawings, A represents the body of my improved wheel; B, the axle on which this wheel is applied; and C is the flange surrounding the inner edge of the tread or periphery of the wheel, which parts may be constructed as shown, or in any other suitable manner. The periphery or tread of this wheel presents a transversely concave surface, $a$, which should correspond in its shape to the convex surface of the head of the rail D. Outside of the surface $a$ is a cylindrical, or it may be a slightly-tapered surface, $b$, and on the opposite side of the concave $a$ is an annular ridge, $b'$, the flange C, and an intermediate groove, $c$, which latter isolates the concave tread $a$ from the flange C, and keeps this flange from impinging against the inner edge of the rail D, except when there is an extraordinary lateral thrust of the wheel, or during the passage of the wheel around short curves in the railway. Among some of the advantages of my improvement over other car-wheels are, that a broad bearing-tread on the rail is obtained, which will prevent lateral displacement or spread of the rails by closely hugging their heads. The flange of the wheel does not rub or drag on the inner edge of a rail, and is, therefore, not liable to ride over a rail, or to displace a train by striking the ends of rail-sections when such ends become slightly loose from any cause.

I am aware that wheels having concave treads have long been known, but I believe that such wheels have never been constructed with an annular groove between the concave tread and the flange of the wheel.

I am aware that car-wheels have been constructed with a convex tread, which necessarily left a groove between the flange and said convex tread; therefore I do not claim such construction, but limit myself to a wheel having a concave tread combined with an annular groove between said concave tread and the flange.

What I claim as new, and desire to secure by Letters Patent, is—

A car-wheel having a concave tread to embrace the rolling surface of a convex top rail, and an annular groove or furrow, $c$, between said tread and the flange C, as shown and described.

In testimony that I claim the above I have hereunto subscribed my name in the presence of two witnesses.

JAMES PEARSON.

Witnesses:
CHARLES T. JONES,
LEANDER MORRIS.